DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 9

T949,008

PROCESS OF RECLAIMING SCRAP VULCANIZED RUBBER, AND THE SOLUBLE RECLAIMED RUBBER THUS PRODUCED

Grant Crane and Edward Leo Kay, Akron, Ohio, assignors to The Firestone Tire & Rubber Company, Akron, Ohio

Continuation of abandoned application Ser. No. 528,515, Nov. 29, 1974, which is a continuation of abandoned application Ser. No. 365,382, May 30, 1973. This application Sept. 10, 1975, Ser. No. 611,950

Int. Cl.[2] C08J *11/04*

U.S. Cl. 260—2.3

No Drawing. 16 Pages Specification

From 2 to 150 parts by weight of vulcanized rubber scrap is added to 100 parts of a rubber processing oil, and the mixture is heated for 0.1 to 50 hours at 400° to 700° F. to produce a soluble reclaimed rubber. The product is incorporated into new rubber articles, such as tires.